(No Model.)

J. M. P. PANETTI.
BASKET.

No. 269,812. Patented Dec. 26, 1882.

Witnesses:
Chas. W. Hickey
D. F. Keleher

Inventor:
John M. P. Panetti,
By J. C. Brecht,
Attorney.

N. PETERS, Photo-Lithographer, Washington, D. C.

UNITED STATES PATENT OFFICE.

JOHN M. P. PANETTI, OF BALTIMORE, MARYLAND.

BASKET.

SPECIFICATION forming part of Letters Patent No. 269,812, dated December 26, 1882.

Application filed September 27, 1882. (No model.)

*To all whom it may concern:*

Be it known that I, JOHN M. P. PANETTI, a citizen of the United States, residing at Baltimore, in the county of Baltimore and State of Maryland, have invented certain new and useful Improvements in Baskets; and I do hereby declare the following to be a full, clear, and exact description of the invention, such as will enable others skilled in the art to which it appertains to make and use the same.

My invention relates to improvements in baskets intended particularly for market use; and the object is to furnish a basket that is convenient for carrying meat, vegetables, eggs, &c., and at the same time by which the eggs can be readily inspected or tried to ascertain whether they are good or bad, and this in an unfailing manner.

The invention consists in the construction and arrangement of parts of a basket, as will be more fully described hereinafter, and more specifically pointed out in the claims, reference being had to the accompanying drawings and the letters of reference marked thereon.

Like letters of reference designate like parts in the different figures of the drawings, in which—

Figure 1:
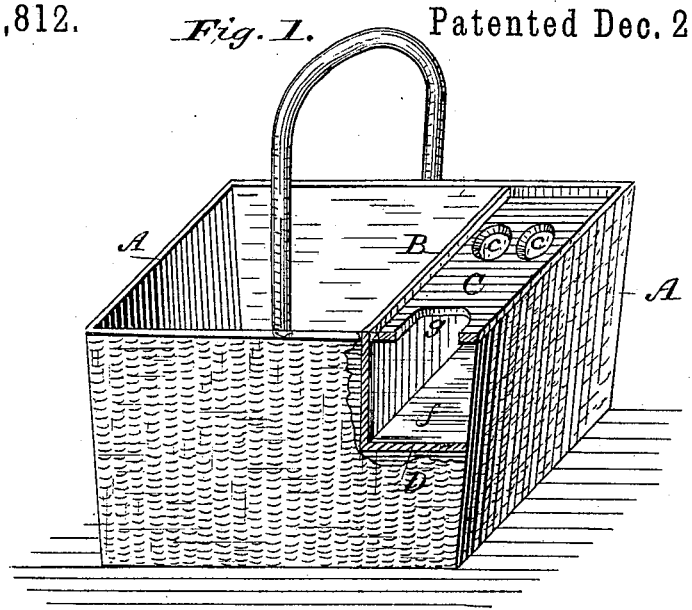
Figure 2:
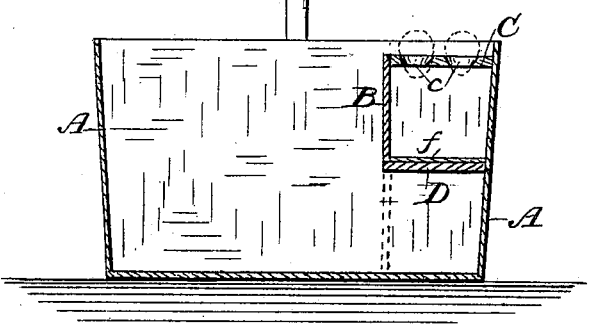
Figure 3:
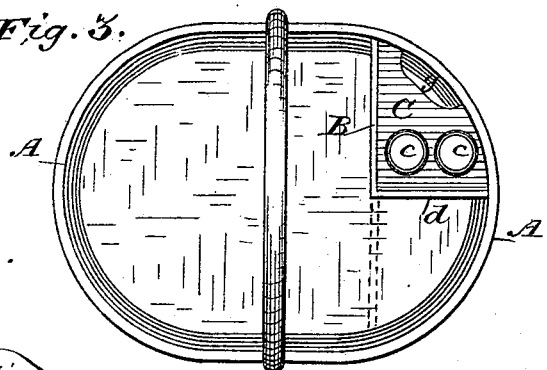

Figure 1 represents a view of my basket in perspective. Fig. 2 is a longitudinal section of the same. Fig. 3 is a modification of a basket of different shape, with a dark-chamber on half the width of the basket.

In the drawings, A represents a basket made of any desired size and configuration, and of any suitable material. This basket is provided with a partition, B, which may be made of willow-ware, wood, or any other suitable material, and it may extend across the entire end of the basket or only part way across, as shown in Fig. 3. A top or cover, C, is secured to the partition and sides of the basket, and in it are arranged one or more holes, c, into which the eggs are to be placed when it is desired to inspect them, as shown by dotted lines in Fig. 2. The edges of these holes are preferably beveled, so as to better retain the eggs when placed in position for observation.

A bottom, D, is secured to the partition and the sides of the basket, and on said bottom is placed or attached a mirror or looking-glass, *f*, or other suitable reflecting material.

In some instances, when it is desired, the partition B does not extend entirely across the sides of the basket, as shown in Fig. 3, and a side or end piece, *d*, must of course be then secured to the bottom, top, and side of the basket, so as to form a dark-chamber of this part of the basket only.

If desired, the partition B, as well as the dark-box, may be made removable for cleaning, &c. An opening or eye-hole, *g*, is made in the front of the top C, through which the person inspecting the eggs can look into the dark-box. They are then exposed to the sun or to an artificial light of sufficient brilliancy so as to subject them to the transmission of light. The eye is then applied to the eye-hole, when the images or reflections of the eggs in the mirror will with certainty show if the eggs are good or bad. If they are fresh and good, the images will be clear; but if they are bad the reflection will be dark, and they can be instantly detected.

Having thus described my invention, what I claim, and desire to secure by Letters Patent, is—

1. A basket provided with a partition, B, forming one side of a dark-box, having a top, C, with holes *c* for temporarily holding eggs for inspection, a mirror, *f*, at the bottom D, and an observation-opening, *g*, all arranged as shown, and for the purpose specified.

2. A basket provided with a partition, B, forming one side of a dark-box extending only partly across the basket, and having a side, *d*, a top, C, with holes *c*, bottom D, with mirror, *f*, and the opening *g*, all arranged as shown, and for the purpose set forth.

In testimony whereof I hereby affix my signature in presence of two witnesses.

JOHN M. P. PANETTI.

Witnesses:
PHILIP R. VOGEL, Sr.,
WILLIAM SUESS.